Nov. 26, 1957 D. S. BLACK 2,814,271
STOCK FEEDER
Filed March 22, 1957 3 Sheets-Sheet 1

INVENTOR.
DON S. BLACK,
BY
McMorrow, Berman + Davidson
ATTORNEYS.

INVENTOR.
DON S. BLACK,

Nov. 26, 1957
D. S. BLACK
2,814,271
STOCK FEEDER
Filed March 22, 1957
3 Sheets-Sheet 3
FIG. 3.
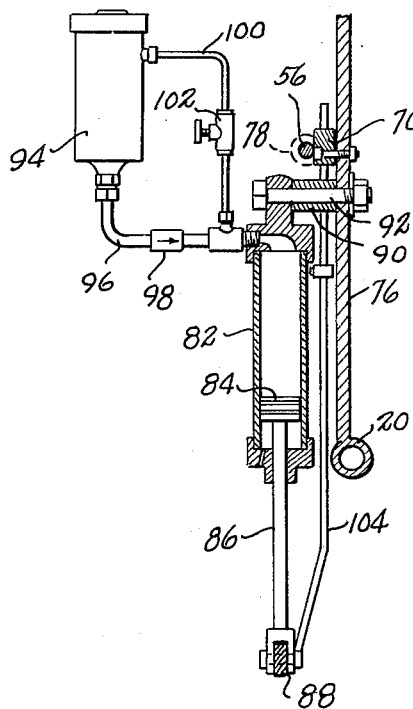
FIG. 4.
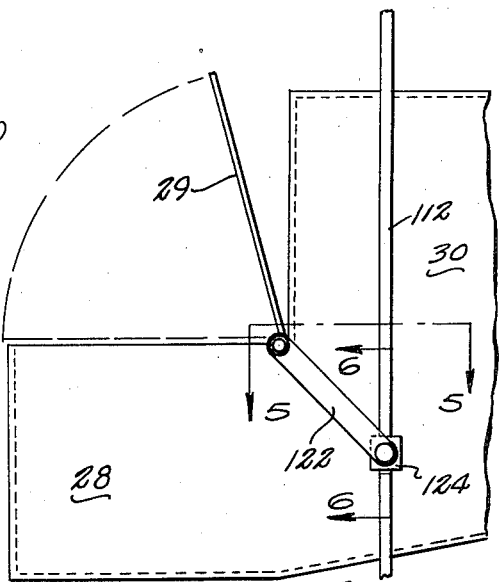
FIG. 5.
FIG. 7.
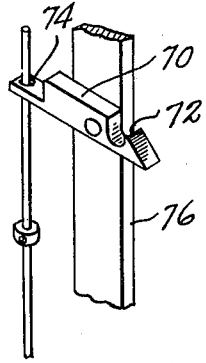
FIG. 6.
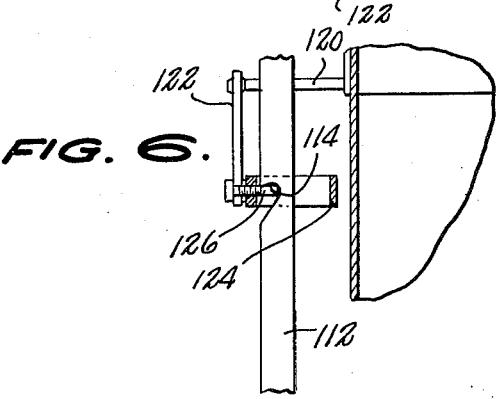
INVENTOR.
DON S. BLACK,
BY
McMorrow, Berman + Davidson
ATTORNEYS,

United States Patent Office 2,814,271
Patented Nov. 26, 1957

2,814,271

STOCK FEEDER

Don Spencer Black, Snowflake, Ariz.

Application March 22, 1957, Serial No. 647,848

4 Claims. (Cl. 119—55)

The present invention relates to a stock feeder.

An object of the present invention is to provide a stock feeder which enables a stockman to efficiently supply an animal with a predetermined ration of grain feed for supplementing range feed.

Another object of the present invention is to provide a stock feeder which is automatic in operation and allows an animal an interval of time to eat grain feed from a feed box and denies the animal access to the feed box after such interval.

A further object of the present invention is to provide a stock feeder which provides grain or other dry feed for an animal in an enclosure which opens to admit the animal from one area and causes the animal to leave the enclosure after feeding and to enter another area, one which causes the animal to move quickly out of the enclosure after feeding to thereby enable a group of animals to be fed in the minimum length of time, and one which after continued use teaches the animals to quickly and efficiently consume the feed offered so as to gain the maximum weight per unit of feed.

A still further object of the present invention is to provide a stock feeder which is sturdy in construction and simple in structure, one economical to manufacture and assemble, and one which is highly efficient in action.

These and other objects and advantages of the present invention wil be fully apparent from the following description when taken in connection with the annexed drawings, in which:

Figure 3 is a sectional view, on an enlarged scale, taken on the line 3—3 of Figure 2;

Figure 4 is a sectional view, on an enlarged scale, taken on the line 4—4 of Figure 2;

Figure 5 is a sectional view taken on the line 5—5 of Figure 4;

Figure 6 is a sectional view taken on the line 6—6 of Figure 4; and

Figure 7 is an isometric view of the latch means for controlling the opening and closing of the exit gate.

Figure 1:
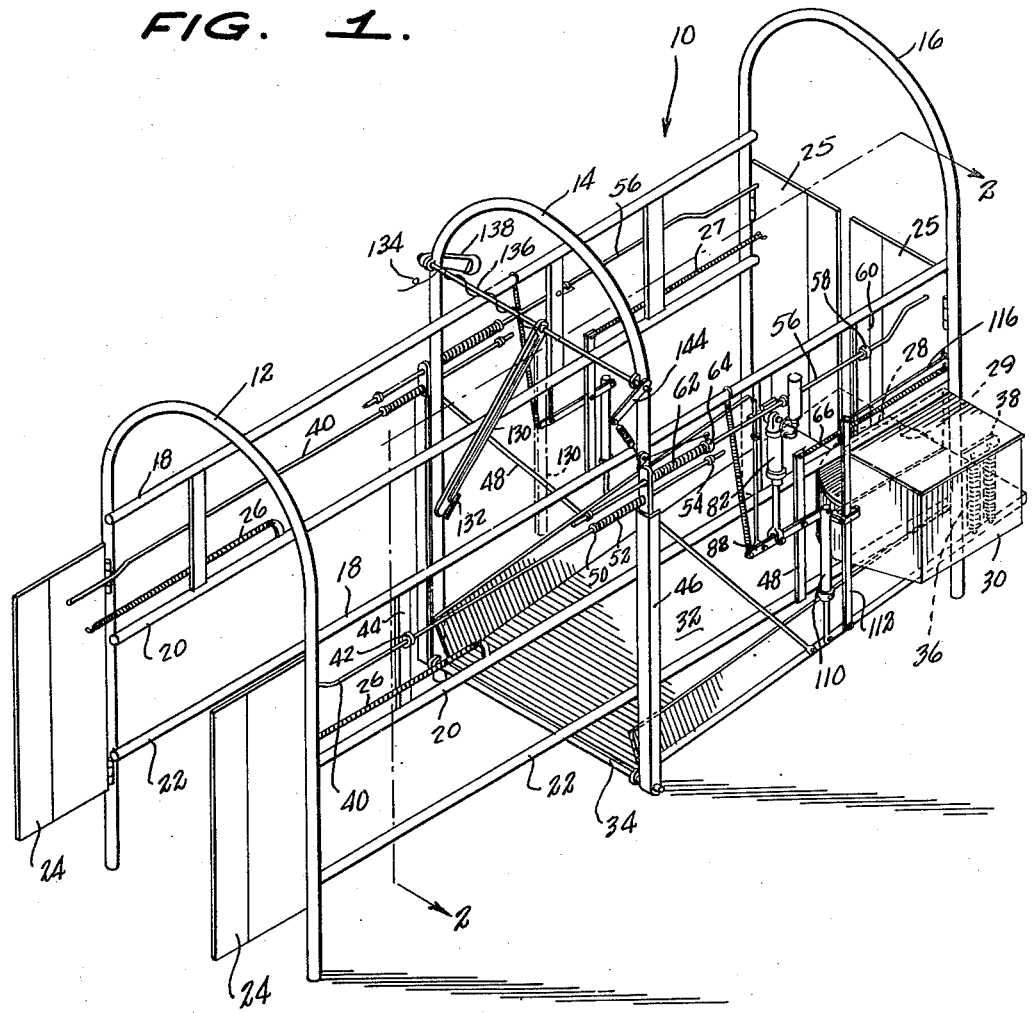
Figure 1 is an isometric view of the stock feeding device according to the present invention.

Referring in greater detail to the drawings in which like numerals indicate like parts throughout the several views, the stock feeding device according to the present invention comprises an enclosure such as a cattle stall 10 formed of three inverted U-shaped members 12, 14, and 16, arranged in parallel spaced aligned relation and connected together, on each side, by horizontally disposed bars 18, 20, and 22, which are positioned in superimposed spaced relation.

The cattle stall 10 has open entrance and exit ends with a gate 24 positioned adjacent the entrance end of the stall 10 and normally in an open position with respect to the entrance 10. The gate 24 is in two parts and each part is hingedly connected to the adjacent leg of the member 12 for swinging movement about a vertical axis from the open position to a closed position. Identical coil springs 26 are connected one to each part of the gate 24 and bias the gate 24, in each of its parts, to the closed position.

Another gate 25, also formed in two parts, is positioned adjacent the exit end of the stall 10 and is normally in a closed position with respect to the exit end of the stall 10. Each part of the gate 25 is connected to the adjacent hinge of the member 16 for swinging movement about a vertical axis from the closed position to an open position. Other identical springs 27 are operatively connected to the two parts of the gate 25 for biasing the gate 25 to the closed position.

A feed box 28, having a cover 29, is positioned within the stall 10 inwardly of and spaced from the gate 24 and has one wall thereof connected in communication with a supply reservoir 30 which is exteriorly of the stall 10. The feed box 28 and the reservoir 30 are formed integrally and are supported at one end upon the adjacent leg of the member 16 and along the upper edge of the reservoir 30 by the underside of the bar 20.

A treadle 32 is positioned within the stall 10 between the feed box 28 and the gate 24 and has one end pivotally mounted upon a rod 34 which is journaled in the free ends of the legs of the member 14. The other end of the treadle 32 is dependingly carried upon the lower end of the coil springs 36 which have their upper ends connected to a horizontally disposed lug 38 projecting from each of the legs of the member 16.

Releasable holding means is provided for holding each section of the gate 24 in the open position so that an animal may enter the stall 10 through the open entrance end. Specifically, this holding means comprises, on each side of the stall 10, a horizontally disposed rod 40 having an intermediate portion traversing an eye-formation 42 carried on the exterior face of a vertically disposed frame member 44 which extends between the adjacent bars 18 and 20 and is secured thereto. One end of each of the rods 40 abuttingly engages the adjacent section of the gate 24, as shown most clearly in Figure 1, to hold the section of the gate 24 in the open position until an animal has entered the stall 10 and has placed its weight upon the treadle 32. The portion of each rod 40 adjacent the other end thereof extends loosely through a hole provided in the upper end portion of the adjacent one of the upright arms 46 which have their lower end portions fixedly secured to the outer ends of the rod 34. A brace member 48 extends between the upper end portion of each of the arms 46 and the adjacent side edge of the treadle 32 and secures the arm 46 on each side of the treadle 32 for movement therewith. A collar 50 is secured to each of the rods 40 between the arm 46 and the eye-formation 42. A coil spring 52 is circumposed about the portion of the rod 40 between the collar 50 and the arm 46 and biases the rod 40 to the position in which the gate 24 is held open by the engagement of the one end of the rod 40 with each section of the gate 24. Another collar 54 on the rod 40 adjacent its end prevents the accidental loss of the rod 40 from its engagement with the arm 46 and serves to limit the movement of the rod 40 in a direction toward the adjacent one of the gate sections. Upon the application of the weight of an animal to the treadle 32, the end of the treadle 32 adjacent the coil springs 36 moves downwardly and the movement of the treadle 32 downwardly causes each of the arms 46 to swing in a clockwise direction, as viewed in Figure 1, thereby permitting the coil springs 36 to pull the adjacent section of the gate 24 to the closed position, the coil springs 52 being free of any compressive engagement with the collar 50 and the adjacent part of the respective arm 46.

Other spring means is mounted on the stall 10 and is engageable with each section of the gate 25 in response to the application to the treadle 32 of the weight of the animal when in the stall 10 and biasing each section of the gate 25 toward open position when the spring means is so engaged. Specifically, this spring means is mounted upon each side of the stall 10 and is identically connected to the treadle 32. This means includes another horizontally disposed rod 56 on each side of the stall 10 and having a portion mounted for sliding movement through an eye-formation 58 carried on the other face of another frame member 60 also secured between the bars 18 and 20 inwardly of the support member 16. Each rod 56 has a portion adjacent its other end slidably mounted in a hole provided in the upper end portion of the adjacent arm 46. Each rod 56 has one end abuttingly engaging the inner face of the adjacent section of the gate 25 and a coil spring 62 circumposed about a portion of each of the rods 56 biases, by bearing against a fixed collar 64 and the rod 56, the rod 56 toward the position in which said one end engages the adjacent section of the gate 25 to hold the latter in the open position.

Releasable latch means is provided for holding each of the rods 56 in a position in which the end thereof is out of engagement with the adjacent section of the door 25 permitting each section of the door 25 to remain in the closed position under the action of the coil spring 66 which is secured to the gate section by one end and has its other end secured to the frame member 68 on each side of the stall 10.

Specifically, this latch means consists in a normally horizontally disposed lever 70 having an upwardly facing notch 72 on one end portion and a vertically disposed aperture 74 extending through its other end portion, as seen in Figure 7. The lever 70 is pivotally connected intermediate its ends to an upright frame member 76 which extends between and is secured to the bars 18 and 20. The latch 12 releasably receives a collar 78 on the adjacent rod 56 and holds the rod 56 from movement as urged by the spring 62 from the full line position (Fig. 2) substantially out of engagement with the adjacent section of the gate 25 to the dotted line position engaging and opening this section of the gate 25. The collar 78 is associated with only one of the rods 56, it being understood that the arms 46, one on each side of the stall 10, connected as they are by means of the collars 64 to the adjacent rods 56, enable the rods 56 to move in unison to open the sections of the gate 25 and that a single latch means, as above described, on one of the rods 56 will hold both of the rods 56 against movement. The rods 56 constitute actuating means for the movement of the gate 25 from the closed position to the open position.

Figure 2:
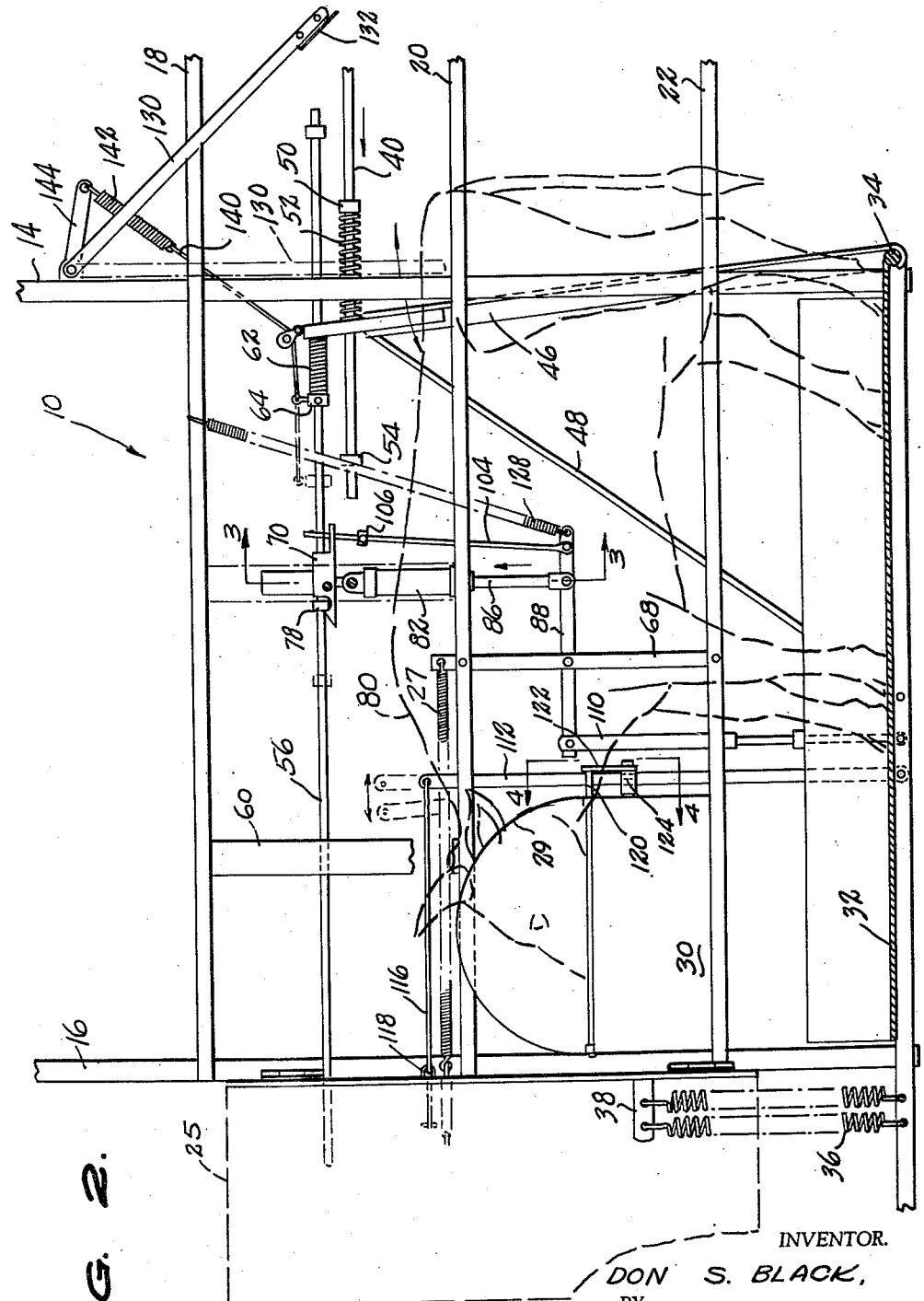
Figure 2 is a sectional view, on an enlarged scale, taken on the line 2—2 of Figure 1.

Time interval settable means is provided connected to the treadle 32 so that the above-described latch means is actuated to the released position responsive to the expiration of a set time interval of application of the weight of an animal to the treadle 32, the animal being indicated in dotted lines in Figure 2 and designated generally by the reference numeral 80. Specifically, the time interval settable means consists in (Fig. 3) an upright hollow cylinder 82 having a piston 84 therein and an actuating rod 86 connected by one end to the piston 84 and having its lower end connected for pivotal movement to a normally horizontal lever 88. The upper end of the cylinder 82 is connected by means of a sleeve 90 and a bolt 92 to the frame member 76. A reservoir 94, containing a supply of hydraulic fluid, is connected by a conduit 96 having a check valve 98 therein to the upper end of the cylinder 82 and a by-pass conduit 100 having a control valve 102 therein also connects the reservoir 94 to the cylinder 82. An actuating rod 104 extends from the lever 88 to the lever 70 and extends through the aperture 74 provided in the end portion of the lever 70. An adjustable collar 106 on the actuating rod 104 is engageable upon the upward movement of the rod 104 to tilt the lever 70 in the counterclockwise direction (Fig. 2) to release the collar 78 from its engagement within the notch 72 in the lever 70. The lever 88 is pivotally connected intermediate its ends to the frame member 68 and has its end remote from its connection to the actuating rod 104 pivotally connected to a downwardly depending arm 110. The lower end of the arm 110 is pivotally connected to the treadle 32 on one side thereof.

Releasable latch means is provided mounted on the stall 10 for holding the cover 29 of the feed box 28 in an open position so that the animal 80 may feed. When released, the latch means permits the cover 29 to move to the closed position under the action of gravity. Means is provided connecting the section of the gate on one side of the stall 10 adjacent the exit end of the stall 10 to the last-named latch means for operating the latch means to the release position responsive to the opening movement of the aforesaid section of the gate 25. Specifically, this means includes (Figs. 4, 5 and 6) a vertically disposed actuating lever 112 having a notch 114 intermediate its ends and having its lower end pivotally connected to the treadle 32. The upper end of the lever 112 is connected by means of a rod 116 to an eye-formation 118 on the adjacent one of the sections of the gate 25. In Figure 2, it will be seen in dotted lines that the lever 112 moves upwardly with the treadle 32 and also moves forward and away from the section of the gate 25 with the opening and closing movements of the gate sections. The cover 29 is fixed to a horizontally disposed rod 120 which has an end projecting beyond one side of the feed box 28 and is connected by a lever 122 to an elongated clevis 124 which is pivotally mounted upon the end of the lever 122 and surrounds the adjacent portion of the lever 112. The connection of the rod 116 to the adjacent section of the gate 25 and the upper end of the lever 112 serves to move the lever 112 from a position in which the notch 114 is engageable with a shelf element 126 provided on the inside of the clevis 124 to a position in which it is out of engagement with the shelf element 126. The lever 112 moves upwardly and downwardly with the treadle 32. A coil spring 128 extends between the bar 18 and the free end of the lever 88 and serves to take up any lost motion in the connection of the lever 88 with the piston rod 86 and the actuating rod 104.

The lever 122 is rigid with the cover 29 of the feed box 28 and when the notch 114 is out of engagement with the shelf element 126, the cover 29 descends to the closed position over the open top of the feed box 28 under the action of the gravity. Upon the next upward movement of the treadle 32, the lever 112 is carried upwardly and, if the section of the gate 25 is in the closed position, the notch 114 reengages with the shelf element 126 and upon the next downward movement of the treadle 32 and the attached lever 112, the engagement of the notch 114 with the shelf element 126 causes the lever 122 to be moved downwardly and to raise the cover 29 of the feed box 28.

Means is provided for causing the animal 80 to move quickly from the stall 10 after it has consumed a predetermined amount of food. Such means consists in a prod or arm 130 having its upper end pivotally connected to the one U-shaped member 14 and carrying on its lower end an electrode 132 connected by a wire 134 to a source of shocking current, such as an electric fence near which the stall 10 may be placed. The arm 130 is mounted intermediate the ends of a horizontally disposed bar 136, one of the ends of which carries a counterweight 138 for maintaining the arm 130 in the full line position shown in Figures 1 and 2. A short length of cable 140 has one end connected to a coil spring 142 and its other end connected to the collar 64 which is secured to the adjacent rod 56. The other end of the coil spring 142 is secured to a lever 144 which is fixedly secured on the end of the bar 136 opposite to the counterweight 138. Upon movement of the rod 56 in the direction toward the exit end of the stall 10, the collar 64 pulls the cable 142 to move the arm 130 from the full line position to the dotted line position shown in Figure 2 and to thereby prod the animal 80 with the electrode 132 and to effect the sudden movement of the animal 80 forwardly in the stall 10 and out of the exit end thereof between the sections of the gate 25.

In use, the stall 10 is preferably placed along a wall or fence with the entrance end connected in communication with one fenced-in area and the exit end connected in communication with another fenced-in area. With the gate 24 open, and a supply of feed in the feed box 28, stock may be driven so that a single animal 80 enters the stall between the sections of the gate 24. Upon application of the animal's weight to the treadle 32, the treadle 32 tends to move downwardly and forcing the piston 84 upwardly in the cylinder 82. Resistance to movement of the hydraulic fluid in the cylinder 82 through the by-pass conduit 100, governed by the control valve 102, serves as a time interval settable means for permitting the treadle 32 to move downwardly at a slow rate of speed. As the piston 84 and the connected piston rod 86 move upwardly, the actuating rod 104 carrying the collar 106 moves upwardly to the position in which the collar 106 trips the lever 70 to release the collar 78 from its engagement within the notch 72 in the lever 70. The stored-up compressed strength in the coil spring 62 causes the rods 56, one on each side of the stall 10, to move forwardly pushing open the sections of the gate 25 and moving the lever 112 to where the notch 114 is disengaged from the shelf element 126. Simultaneously, the cable 140 pulls the lever 144 to swing the arm 130 to a point where the electrode 132 prods into the flank of the animal 80. With the gates open and the cover 29 on the feed box 28 released, the animal 80 is urged to leave through the sections of the gate 25. Upon release of the animal's weight from the treadle 32, the springs 36 return the treadle 32 to the up position with the arms 46 compressing the spring 52 to the degree necessary to move the rods 40 into engagement again with the sections of the gate 24, thereby opening the gate 24. The movement of the arms 46 toward the gate 25 releases the compression of the spring 62 so that the springs 27 are enabled to swing the sections of the gate 25 to the closed position, pushing the rods 56 back to the position in which the collar 78 is once more engaged in the notch 72 to thereby hold the rods 56 in their position substantially out of engagement with the sections of the gate 25. The upward movement of the treadle 32 returns the piston rod 86 to its lowermost position drawing the piston 84 downwardly within the cylinder 82 and drawing into the cylinder 82 a new supply of hydraulic fluid.

Adjustment of the control valve 102 and positioning of the collar 106 on the actuating rod 104 serves to adjust the time interval that the animal 80 is enabled to secure the feed from the feed box 28.

The stock feeding apparatus according to the present invention has been found to efficiently provide a supplement grain or other dry food for stock normally on range. It has been found that the animals automatically feed quickly and without wastage and after repeated use of the stock feeder of the present invention, the animals accustom themselves to it to the extent that they feed rapidly with a maximum gain in weight for the ration of feed provided.

What is claimed is:

1. A stock feeding device comprising a cattle stall having open entrance and exit ends, a first gate positioned adjacent the entrance end of said stall and normally in one open position with respect to said entrance end and connected to said stall for movement from the open position to a position closing said entrance end, releasable holding means mounted on said stall operable to hold said first gate in the open position, a second gate positioned adjacent the exit end of said stall and normally in closed position with respect to said exit end and connected to said stall for movement from the closed position to an open position, a feed box positioned within said stall inwardly of and spaced from said entrance end, a treadle positioned within said stall between said feed box and said entrance end, actuating means mounted on said stall engageable with said second gate when the latter is in the closed position and operable when engaged to move said second gate to open position responsive to the application of the weight of an animal to said treadle after having entered said stall, releasable latch means mounted on said stall for holding said actuating means in an out of engagement position, and time interval settable means connected to said treadle and said latch means so that said latch means is actuated to released position responsive to the expiration of the set time interval of application of the weight of said animal to said treadle.

2. A stock feeding device comprising a cattle stall having open entrance and exit ends, a first gate positioned adjacent the entrance end of said stall and normally in an open position with respect to said entrance end and connected to said stall for movement from the open position to a position closing said entrance end, releasable holding means mounted on said stall operable to hold said first gate in the open position, a second gate positioned adjacent the exit end of said stall and normally in closed position with respect to said exit end and connected to said stall for movement from the closed position to an open position, a feed box positioned within said stall inwardly of and spaced from said entrance end, a treadle positioned within said stall between said feed box and said entrance end, actuating means mounted on said stall engageable with said second gate when the latter is in the closed position and operable when engaged to move said second gate to open position responsive to the application of the weight of an animal to said treadle after having entered said stall, releasable latch means mounted on said stall for holding said actuating means in an out of engagement position, time interval settable means connected to said treadle and said latch means so that said latch means is actuated to released position responsive to the expiration of the set time interval of application of the weight of said animal to said treadle, and spring means operatively connected to said actuating means biasing said actuating means to the second gate opening movement position.

3. A stock feeding device comprising a cattle stall having open entrance and exit ends, a first gate positioned adjacent the entrance end of said stall and normally in an open position with respect to said entrance end and connected to said stall for movement from the open position to a position closing said entrance end, releasable holding means mounted on said stall operable to hold said first gate in the open position, a second gate positioned adjacent the exit end of said stall and normally in closed position with respect to said exit end and connected to said stall for movement from the closed position to an open position, a feed box having an open top positioned within said stall inwardly of and spaced from said entrance end, a cover positioned adjacent said feed box open top and normally in open position and connected to said feed box open top for movement from the open position to a position closing said feed box open top, a treadle positioned within said stall between said feed box and said entrance end, actuating means mounted on said stall engageable with said second gate when the latter is in the closed position and operable when engaged to move said second gate to open position responsive to the application of the weight of an animal to said treadle after having entered said stall, releasable latch means mounted on said stall for holding said actuating means in an out of engagement position, time interval settable means connected to said treadle and said latch means so that said latch means is actuated to released position responsive to the expiration of the set time interval of application of the weight of said animal to said treadle; other releasable latch means mounted on said stall for holding said cover in said open position, and means connecting said second gate to said other latch means operable to move said other latch means to released position responsive to opening movement of said second gate upon movement to released position of said first-named latch means.

4. A stock feeding device comprising a cattle stall having open entrance and exit ends, a first gate positioned adjacent the entrance end of said stall and normally in an open position with respect to said entrance end and connected to said stall for movement from the open position to a position closing said entrance end, releasable holding means mounted on said stall operable to hold said first gate in the open position, a second gate positioned adjacent the exit end of said stall and normally in closed position with respect to said exit end and connected to said stall for movement from the closed position to an open position, a feed box positioned within said stall inwardly of and spaced from said entrance end, a treadle positioned within said stall between said feed box and said entrance end, actuating means mounted on said stall engageable with said second gate when the latter is in the closed position and operable when engaged to move said second gate to open position responsive to the application of the weight of an animal to said treadle after having entered said stall, releasable latch means mounted on said stall for holding said actuating means in an out of engagement position, time interval settable means connected to said treadle and said latch means so that said latch means is actuated to released position responsive to the expiration of the set time interval of application of the weight of said animal to said treadle, means connecting said treadle to said first gate for closing the latter responsive to the application to said treadle of the weight of said animal after having entered said stall, and spring means operatively connected to said first gate biasing said first gate to open position.

No references cited.